US009380552B2

(12) United States Patent
Yu et al.

(10) Patent No.: US 9,380,552 B2
(45) Date of Patent: *Jun. 28, 2016

(54) METHOD AND DEVICE FOR DETACHING USER EQUIPMENT

(71) Applicant: Huawei Technologies Co., Ltd., Shenzhen (CN)

(72) Inventors: Yijun Yu, Shenzhen (CN); Qian Zhang, Mexico City (MX)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,062

(22) Filed: Sep. 29, 2014

(65) Prior Publication Data

US 2015/0016423 A1     Jan. 15, 2015

Related U.S. Application Data

(63) Continuation of application No. 13/619,222, filed on Sep. 14, 2012, now Pat. No. 8,861,496, which is a continuation of application No. 12/971,612, filed on Dec. 17, 2010, now Pat. No. 8,619,712, which is a continuation of application No. PCT/CN2009/072219, filed on Jun. 11, 2009.

(30) Foreign Application Priority Data

Jun. 17, 2008   (CN) .......................... 2008 1 0067876

(51) Int. Cl.
*H04W 60/06*   (2009.01)
*H04W 76/06*   (2009.01)
(Continued)

(52) U.S. Cl.
CPC .......... *H04W 60/06* (2013.01); *H04W 36/0022* (2013.01); *H04W 36/14* (2013.01); *H04W 76/06* (2013.01); *H04W 76/062* (2013.01); *H04W 76/064* (2013.01)

(58) Field of Classification Search
CPC ................. H04W 60/00–60/06; H04W 76/06; H04W 76/064; H04W 76/066; H04W 36/0022
See application file for complete search history.

(56) References Cited

U.S. PATENT DOCUMENTS 6,496,690 B1   12/2002   Cobo et al.
6,801,508 B1   10/2004   Lim
(Continued)

FOREIGN PATENT DOCUMENTS

CN    1753510 A    3/2006
CN    1889756 A    1/2007
(Continued)

OTHER PUBLICATIONS

GSM, "3rd Generation Partnership Project; Technical Specification Group Services and System Aspects; General Packet Radio Service (GPRS); Service Description; Stage 2" (Release 8) 3GPP TS 23.060, V8.1.0, Jun. 2008, 259 pages.
(Continued)

*Primary Examiner* — Xavier Szewai Wong
(74) *Attorney, Agent, or Firm* — Brinks Gilson & Lione

(57) ABSTRACT

A method and device for detaching a user equipment (UE) are disclosed in the present invention. The UE is registered with a mobility management entity (MME) in a packet switched (PS) network and a mobile switching center (MSC) in a circuit switched (CS) network. When the UE needs to detach from the PS network, the MSC receives a Detach Request with a Detach Type indicating the detaching from the PS network only; after receiving the Detach Request, the MSC deletes the context of the PS core network entity and clears the connection between the MSC and the MME. An MME for performing UE detachment is also disclosed in the present invention. The present invention helps reduce the time delay during the subsequent handover and quickly provide users with communications services, so as to improve user's experience and meet the carriers' requirements.

20 Claims, 5 Drawing Sheets

(51) Int. Cl.
*H04W 36/00* (2009.01)
*H04W 36/14* (2009.01)

(56) References Cited

U.S. PATENT DOCUMENTS

| | | | |
|---|---|---|---|
| 7,542,765 B2 | 6/2009 | Kwun et al. | |
| 7,801,083 B2 | 9/2010 | Wu | |
| 8,094,620 B2 | 1/2012 | Diachina et al. | |
| 8,301,165 B2 | 10/2012 | Hu et al. | |
| 8,493,934 B2 | 7/2013 | Yu | |
| 8,493,938 B2 | 7/2013 | Yu | |
| 8,520,593 B2 | 8/2013 | Guo et al. | |
| 8,599,765 B2 * | 12/2013 | Zhao | H04W 60/06 370/328 |
| 8,619,712 B2 * | 12/2013 | Yu | H04W 76/062 370/331 |
| 8,861,496 B2 * | 10/2014 | Yu | H04W 76/062 370/338 |
| 2008/0233947 A1 | 9/2008 | Herrero-Veron | |
| 2008/0320149 A1 * | 12/2008 | Faccin | H04W 76/041 709/228 |
| 2009/0239526 A1 * | 9/2009 | Zhao | H04W 60/06 455/424 |
| 2009/0245177 A1 | 10/2009 | Zhao et al. | |
| 2009/0258671 A1 | 10/2009 | Kekki et al. | |
| 2009/0305707 A1 | 12/2009 | Pudney | |
| 2010/0081435 A1 | 4/2010 | Huang | |
| 2010/0172336 A1 | 7/2010 | Pehrsson et al. | |
| 2011/0085517 A1 | 4/2011 | Yu et al. | |
| 2011/0280217 A1 * | 11/2011 | Drevon | H04W 48/18 370/331 |
| 2012/0009952 A1 * | 1/2012 | Zhang | H04W 68/00 455/458 |
| 2012/0113982 A1 | 5/2012 | Akselin et al. | |
| 2012/0127957 A1 | 5/2012 | Koskinen et al. | |

FOREIGN PATENT DOCUMENTS

| | | |
|---|---|---|
| CN | 101043707 A | 9/2007 |
| CN | 101047973 A | 10/2007 |
| CN | 101052054 A | 10/2007 |
| CN | 101500212 A | 8/2009 |
| WO | WO 00/18171 A1 | 3/2000 |
| WO | WO 2007/045264 A1 | 4/2007 |
| WO | WO 2007/129045 A1 | 11/2007 |
| WO | WO 2008/058877 A1 | 5/2008 |
| WO | WO 2009/152738 A1 | 12/2009 |

OTHER PUBLICATIONS

Huawei, "Discussion about the detach procedure in CS Fallback and ISR scenario" Agenda Item 6.8, 3GPP TSG SA WG2 Meeting #69. Miami, Florida, Nov. 17-21, 2008, 4 pages.

Huawei, "The Handling of the UE after the EPS detach only" Change Request, 24.301 CR 0017 rev. 1 Current Version 8.0.0, 3GPP TSG CT WG1 Meeting #57. San Antonio(TX), Feb. 9-19, 2009, 2 pages.

Global System for Mobile Communications, $3^{rd}$ Generation Partnership Project; Technical Specification Group Services and System Aspects; Circuit Switched Fallback in Evolved Packet System; Stage 2 (Release 8), 3GPP TS 23.272, V8.0.0, Jun. 2008.

Global System for Mobile Communications, $3^{rd}$ Generation Partnership Project; Technical Specification Group Services and System Aspects; General Packet Radio Service (GPRS) Enhancements for Evolved Universal Terrestrial Radio Access Network (U-TRAN) access (Release 8), 3GPP TS 23.401,V8.2.0, Jun. 2008.

GSM, "$3^{rd}$ Generation Partnership Project: Technical Specification Group Services and System Aspects; Circuit Switched Fallback in Evolved Packet System; Stage 2" (Release 8) 3GPP TS 23.272, V2.0.0, Jun. 2008.

Nortel Networks, "Pseudo-CR on Optimized Handover Impacts on NAS" 9.2.2, 3GPP TSG CT WG1 Meeting #52, Jeju Island, Korea, Apr. 7-11, 2008. C1-081019.

GSM, "$3^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 8) 3GPP TS 23.401, V8.2.0, Jun. 2008.

$3^{rd}$ Generation Partnership Project; Technical Specification Group Core Network and Terminals; Non-Access-Stratum (NAS) protocol for Evolved Packet System (EPS); Stage 3 (Release 8) 3GPP TS 24.301, V0.3.0, May 2008, 113 pages.

* cited by examiner

METHOD AND DEVICE FOR DETACHING USER EQUIPMENT

CROSS-REFERENCE TO RELATED APPLICATIONS

This application is a continuation of U.S. application Ser. No. 13/619,222, filed on Sep. 14, 2012, which is a continuation of U.S. application Ser. No. 12/971,612, filed on Dec. 17, 2010, which is a continuation of International Application No. PCT/CN2009/072219, filed on Jun. 11 2009. The International Application claims priority to Chinese Patent Application No. 200810067876.2, filed on Jun. 17, 2008. The afore-mentioned patent applications are hereby incorporated by reference in their entireties.

FIELD OF THE DISCLOSURE

The present invention relates to the field of mobile communications technologies, and more particularly, to a technology for detaching a user equipment (UE) from a packet switched (PS) network in which the UE has been registered.

BACKGROUND

To address the challenges brought about by wireless broadband technologies and keep the leading position of 3GPP network, the 3GPP launched the Long Term Evolution (LTE) in 2004. The LTE defines a new architecture of mobile communications network, namely, evolved packet system (EPS).

Many services of carriers operate in the circuit switched (CS) domain in the GPRS/UMTS, and a method is developed to connect the EPS to the CS core network to reuse the existing CS services in the EPS, namely, CS fallback (CSFB). The registration process of the CSFB is as follows: A UE transmits an Attach Request to a mobile management entity (MME). After receiving the Attach Request, the MME performs the Attach operation. In a standard Attach process, after receiving a subscription data insertion process from a home subscriber server (HSS), the MME initiates the Location Update (LU) process to the Mobile Switching Center/Visitor Location Register (MSC/VLR) to register the UE. After receiving the Location Update Request, the MSC/VLR stores information (e.g., address information) about the MME, and connects to the MME through an SGs interface, and then performs a standard CS domain LU process. When the LU process is complete, the MSC/VLR notifies the MME that the LU process ends. After that, the MME notifies the UE that the Attach process ends. Now, the UE successfully creates a context and registers it in the EPS and CS networks.

However, the prior art offers no solution in detaching the UE from the EPS.

SUMMARY

The present invention is directed to a method and device for detaching a UE from an EPS based on the indicator carried in the Detach Type message, thereby meeting the requirements of the communications services.

The embodiments of the present invention disclose a method for detaching a UE registered with an MME in the EPS and an MSC in the CS network. The method includes: when the UE needs to detach from the EPS, receiving, by the MSC, a Detach Request with a Detach Type, the Detach Type indicating the detaching from the EPS only; after receiving the Detach Request, deleting, by the MSC, the context of the packet switched core network entity, and clearing the connection between the MSC and the MME.

The embodiments of the present invention disclose an MME for managing context of a UE in the EPS, including: a triggering unit, configured to trigger the Detach process of a UE; an instructing unit, configured to receive notifications from the triggering unit, and transmit messages to an evolved NodeB (eNodeB) to instruct a UE to select a CS cell; and a detaching unit, configured to receive notifications from the triggering unit, transmit messages to the MSC, instruct the MSC to delete the stored context of the MME, and release or clear the connection between the MSC and the MME.

The method and device disclosed in the embodiments of the present invention can be adopted to detach a UE from only the EPS during the CSFB, and thus reduce the time delay during the subsequent handover and quickly provide users with communications services, thereby improving user's experience and meeting the carriers' requirements.

DETAILED DESCRIPTION OF THE EMBODIMENTS

Figure 1:
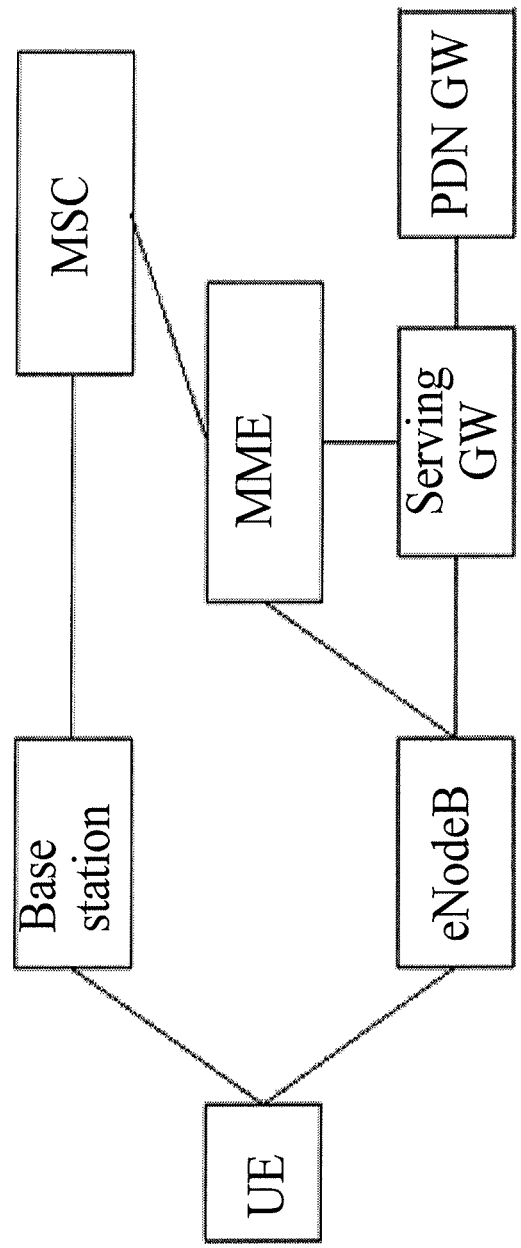
FIG. 1 shows an architecture of an EPS/CS hybrid network.

FIG. 1 illustrates an architecture of an EPS/CS hybrid network. The MME in the EPS connects to the MSC in the existing CS core network through an SGs interface. In this network architecture, if a UE residing in the EPS network desires to initiate the CS mobile originating (MO) service in the CS network, the UE needs to switch to the GPRS/UMTS network and select a 2G/3G cell to camp on, and then starts the MO service. If the UE resides in the EPS, when the MSC receives a mobile terminated (MT) service, the MSC transmits a paging message to the MME in the EPS through an SGs interface, the MME pages the UE through the EPS. After receiving the paging message, the UE needs to switch to the GPRS/UMTS network, select a 2G/3G cell to camp on the cell, and then complete the subsequent processing of the MT service.

The embodiments of the present invention provide a method of using a Detach Type in the Detach process. The Detach Type is set to indicate detaching UE from the EPS only. According to the indication, the UE detaching from the EPS network is complete. Based on this, the MME may transmit S1 Initial UE Context Request to the eNodeB through an S1 interface to instruct the UE to select a CS cell for CS communications services. That is, the UE selects an appropriate CS cell based on conditions such as current location and signal strength to provide CS service.

Figure 2:
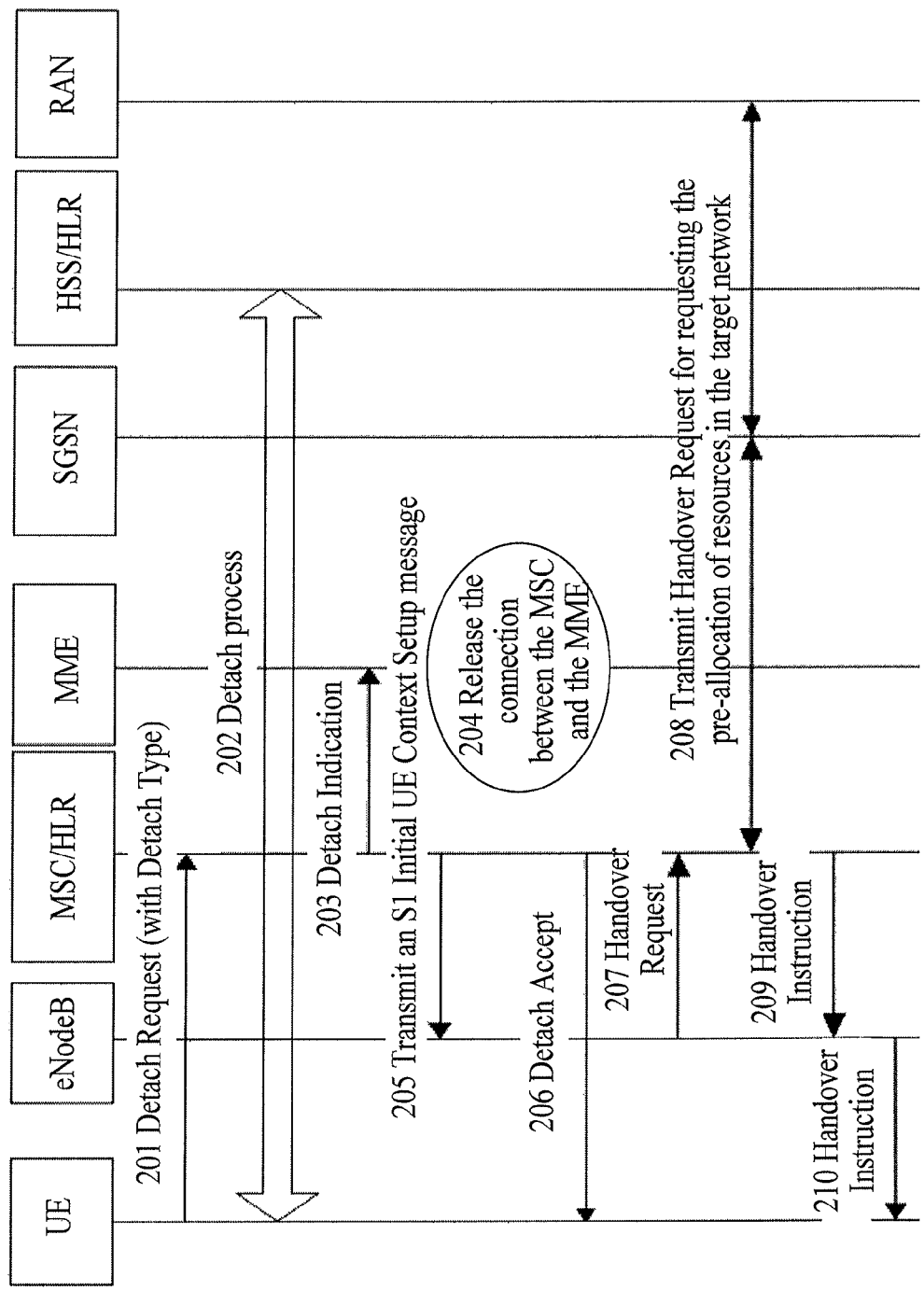
FIG. 2 is a flowchart of detaching a UE according to a first embodiment of the present invention.

The following describes in detail the solution of the present solution with reference to FIG. 2 and some exemplary embodiments.

FIG. 2 is a flowchart of detaching a UE according to a first embodiment. The method includes the following:

Step 201: A UE transmits a Detach Request to the MME, the message carrying a Detach Type indicating EPS Detach Only.

Step 202: The Detach process is initiated to release the UE's resources in the EPS. The MME deletes the mobility management context and bearer context of the UE, and instructs the serving gateway (GW) to delete the bearer context relating to the UE stored in the serving GW, and the context relating to the UE in the packet data network (PDN) GW is also deleted.

Step 203: The MME transmits an International Mobile Subscriber Identity (IMSI) Detach Indication message to the MSC/VLR, the message carrying a Detach Type indicating EPS Detach Only. Alternatively, other message may also be used to indicate the EPS Detach Only After receiving the message, the MSC/VLR knows that EPS detachment only is required.

Step 204: The MSC/VLR performs the operation according to the Detach Type. If EPS detachment only is required, the connection between the MSC/VLR and MME is released or cleared, and the MSC deletes all the contexts relating to the MME.

Step 205: After receiving the Detach Request, the MME knows that EPS detachment only is required according to the Detach Type, and then transmits an S1 Initial UE Context Setup message to the eNodeB. The S1 Initial UE Context Setup message is originally used to create a context for the UE in the eNodeB; but in the embodiments of the present invention, the message may be used to instruct the eNodeB to transmit a message to the UE so as to instruct the UE to select a CS cell. The message carries a Detach Indication, based on which the eNodeB may know that the UE needs to select a CS cell.

The MME may also transmit other message to the eNodeB to instruct the UE to select a CS cell.

The sequence of performing step 203 and step 205 is not limited, but step 204 must be performed after step 203.

Step 206: The MME may transparently transmit a Detach Accept message to the UE through the eNodeB to indicate that the UE detachment is complete. In an embodiment of the present invention, after receiving the Detach Complete message, the UE actively selects a CS cell. That is, the UE selects an appropriate CS cell based on the current information such as the strength of the signals transmitted by a base station to provide CS service. This step is optional in this embodiment. If the MME does not perform this step, the UE may also obtain an instruction on CS cell selection through step 210.

Step 207: The eNodeB transmits a Handover Request message to the MME to request the pre-allocation of resources in the target network and initiate the PS domain handover process.

Step 208: The MME receives the Handover Request from the eNodeB, and performs handover with the serving GPRS support node (SGSN). This step includes: transferring, by the MME, the received Handover Request to the SGSN; after receiving the Handover Request, instructing, by the SGSN, the base station controller (BSC) to pre-allocate resources for the UE, and then transmitting information about the resources to the MME, for example, transmitting frequencies relating to the radio access to the MME.

Step 209: The MME transmits the resource information to the eNodeB.

Step 210: The eNodeB transfers the received network resource information to the UE, and instructs the UE to select a CS cell. The UE selects an appropriate cell based on the resource information, and then accesses the CS network.

CS cell selection described in this embodiment is directed to selecting a cell with the best signals in the public land mobile network (PLMN). If the UE stores information about the PLMN, for example, frequency and scrambling, the UE will first search for an appropriate cell based on such information (i.e., stored information cell selection). In this way, the UE may quickly access the communications network.

After the MME transmits an S1 Initial UE Context Setup message to the eNodeB, if the target network supports neither PS handover nor the dual transfer mode (DTM) that combines PS and CS, the Network Assisted Cell Change (NACC) process needs to be initiated.

Figure 3:
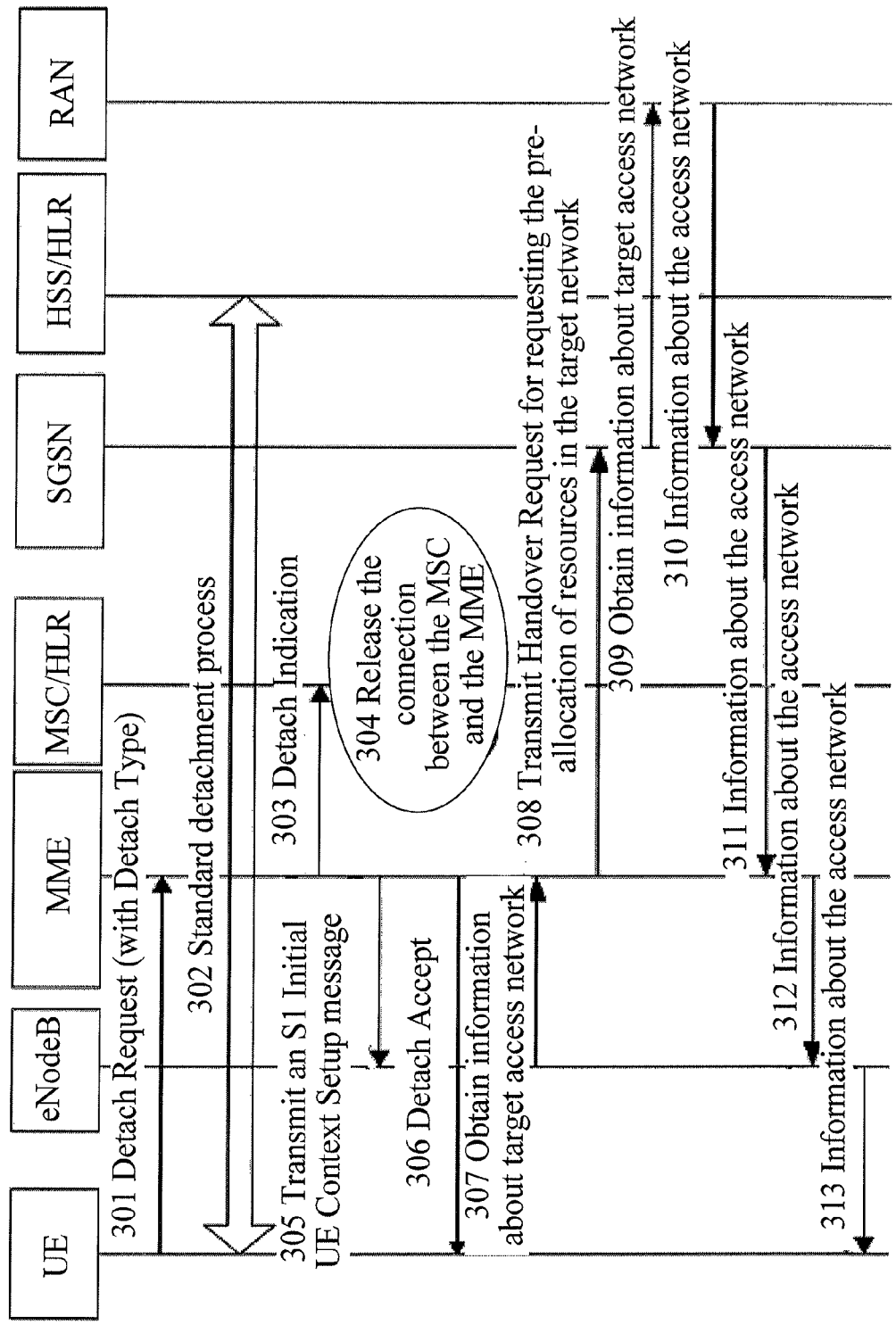
FIG. 3 is a flowchart of detaching a UE according to a second embodiment of the present invention.

The following describes in detail a second embodiment of the present invention with reference to FIG. 3.

Steps 301 to 305 are the same as steps 201 to 205 in the first embodiment, so they are omitted here.

Step 306: The MME may transmit a Detach Accept message to the UE to indicate that the UE detachment is complete. This step is optional in this embodiment. If the MME does not perform this step, the UE may also obtain an instruction on CS cell selection through step 313.

Steps 307 to 313: After receiving a CS access information request from the eNodeB, the MME transfers it to the SGSN and transfers the CS access information sent from the SGSN to the eNodeB, and then the eNodeB initiates the NACC process. This step includes: receiving the CS access information through the MME, the SGSN, and the radio access network (RAN) in the CS domain, delivering the information to the UE through the SGSN, the MME, and the eNodeB, and instructing the UE to select a CS cell. The UE may access the CS network based on the received CS access information.

Figure 4:
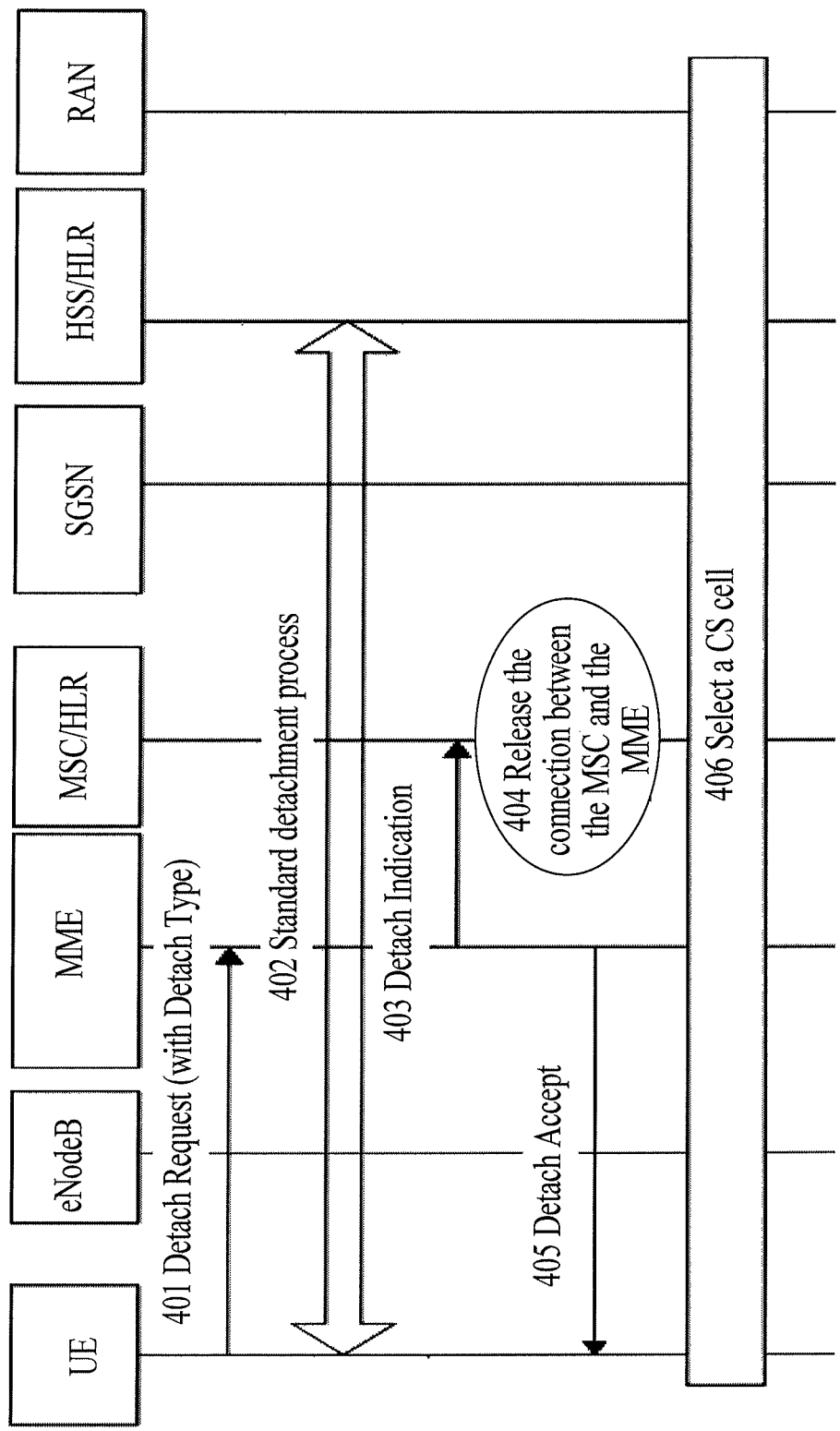
FIG. 4 is a flowchart of detaching a UE according to a third embodiment of the present invention.

The following describes in detail a third embodiment of the present invention with reference to FIG. 4.

Steps 401 to 404 are the same as steps 201 to 204 in the first embodiment, so they are omitted here.

Step 405: The MME may transmit a Detach Accept message to the UE to indicate that the UE detachment is complete, the message carrying an instruction on CS cell selection for the UE.

Step 406: After receiving the Detach Accept message, the UE actively selects a CS cell. That is, the UE selects an appropriate CS cell based on the current information such as the strength of the signals transmitted by a base station to provide CS service.

In other embodiments of the present invention, the Detach process may be initiated by the MME, HSS, or home location register (HLR); other processes are the same as those in the preceding two embodiments, so they are omitted here.

Figure 5:
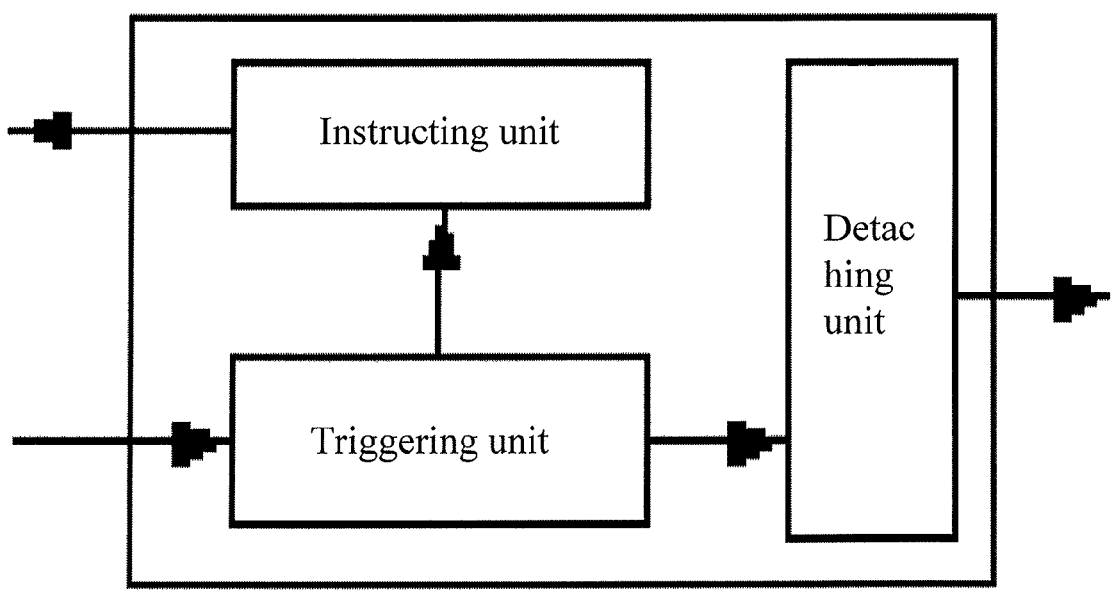
FIG. 5 is a structure block diagram of an MME according to a fourth embodiment of the present invention.

FIG. 5 is a structure block diagram of an MME in a fourth embodiment, which is detailed in the following.

As the core network element (NE) in the EPS, the MME performs mobility management on the control plane, including subscriber context management, mobility management, and so on. The MME includes a triggering unit, an instructing unit, and a detaching unit. The triggering unit is configured to trigger the Detach process of a UE, including actively triggering the Detach process and triggering the Detach process after receiving a Detach Request message from a UE. Accordingly, the triggering unit may include a first triggering subunit or a second triggering unit. The first triggering subunit is configured to trigger the Detach process after receiving a Detach Request message from a UE; the second triggering subunit is configured to actively trigger the Detach process of a UE. The instructing unit is configured to receive notifications from the triggering unit after the triggering unit initiates the Detach process, and transmits messages such as Si Initial UE Context Setup to the eNodeB to instruct the UE to select a CS cell. The instructing unit may be further configured to transmit a Detach Accept message to the UE to notify the UE that the detachment is successful. The detaching unit is configured to: after the triggering unit triggers the Detach process of the UE, receive notifications from the triggering unit, transmit messages to the MSC in the CS domain, instruct the MSC to delete the stored context of the MME, and release or clear the connection between the MSC and the MME. In an embodiment of the present invention, an MME may further include: a switching unit, configured to perform subsequent handover after the UE is detached; or a transferring unit, configured to transfer the CS access information request sent from the eNodeB to the MSC, and transfers the CS network access information sent from the MSC to the eNodeB.

The method disclosed in the embodiments of the present invention may be adopted to detach the UE from only the EPS during the CSFB, reduce the time delay during the subsequent handover, and quickly provide users with communications services, thereby improving user's experience.

The present invention has been described with reference to the preceding exemplary embodiments. These exemplary embodiments, however, are directed to helping understand the core thought and implementation of the present invention. Therefore, those skilled in the art may make modifications to the embodiments and details thereof without departing from the thought and scope of the present invention. Such modifications shall be considered to be the implementation of the present invention.

What is claimed is:

1. A system for detaching a user equipment (UE) in a situation when the UE is attached to an evolved packet system (EPS) network and a circuit switched (CS) network, the system comprising:
   a mobility management entity (MME) device in the EPS network, configured to receive a first message from the UE, wherein the first message comprises a detach type indicating EPS detach only, and transmit an indication message according to the detach type;
   a mobile switching center (MSC)/visitor location register (VLR) device in the CS network, configured to receive the indication message from the MME device, and remove an association with the MME device according to the indication message;
   wherein the MME device is further configured to transmit a second message after the MME device receives the first message.

2. The system according to claim 1, wherein the first message comprises a detach request message.

3. The system according to claim 1, wherein the indication message comprises a detach indication message.

4. The system according to claim 3, wherein the detach indication message comprises an international mobile subscriber identity (IMSI) detach indication message.

5. The system according to claim 1, wherein the second message comprises a detach accept message.

6. The system according to claim 1, further comprising:
   an evolved NodeB (eNodeB), configured to receive the second message from the MME device and transmit the second message to the UE.

7. The system according to claim 1, wherein the second message is used for causing the UE to select a cell in the CS network when the second message is received.

8. The system according to claim 1, wherein the association comprises an SGs association.

9. The system according to claim 1, wherein the indication message comprises a detach type indicating EPS detach only.

10. The system according to claim 1, wherein the MME device is further configured to perform a UE-initiated detach process.

11. A method for detaching a user equipment (UE) in a situation when the UE is attached to an evolved packet system (EPS) network and a circuit switched (CS) network, the method comprising:
    receiving, by a mobility management entity (MME) device in the EPS network, from the UE a first message, wherein the first message comprises a detach type indicating EPS detach only;
    transmitting, by the MME, an indication message to a mobile switching center (MSC)/visitor location register (VLR) device in the CS network according to the detach type;
    removing, by the MSC/VLR, an association with the MME device according to the indication message; and
    transmitting, by the MME device, a second message after the MME device receives the first message.

12. The method according to claim 11, wherein the first message comprises a detach request message.

13. The method according to claim 11, wherein the indication message comprises a detach indication message.

14. The method according to claim 13, wherein the detach indication message comprises an international mobile subscriber identity (IMSI) detach indication message.

15. The method according to claim 11, wherein the second message comprises a detach accept message.

16. The method according to claim 11, further comprising:
    receiving, by an evolved NodeB (eNodeB), the second message from the MME device; and
    transmitting, by the eNodeB, the second message to the UE.

17. The method according to claim 16, further comprising:
    receiving, by the UE, the second message from the eNodeB; and
    selecting, by the UE, a cell in the CS network.

18. The method according to claim 11, wherein the association comprises an SGs association.

19. The method according to claim 11, wherein the indication message comprises a detach type indicating EPS detach only.

20. The method according to claim 11, further comprising:
    performing, by the MME device, a UE-initiated detach process.

* * * * *